Nov. 28, 1967  R. L. CARLSTEDT ET AL  3,354,527
CLAMP MEMBER
Filed Nov. 1, 1965
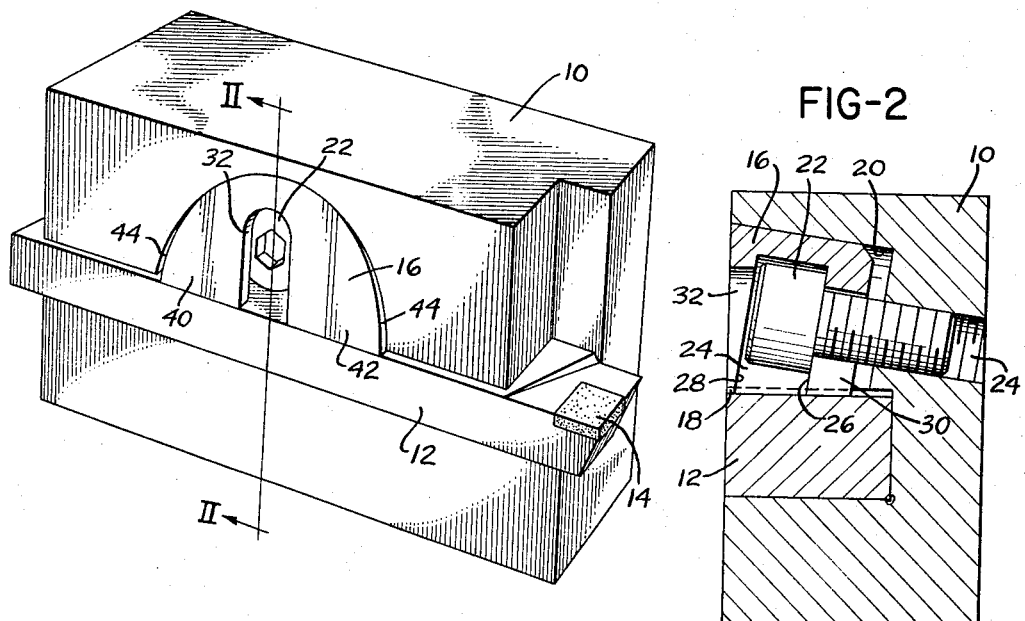
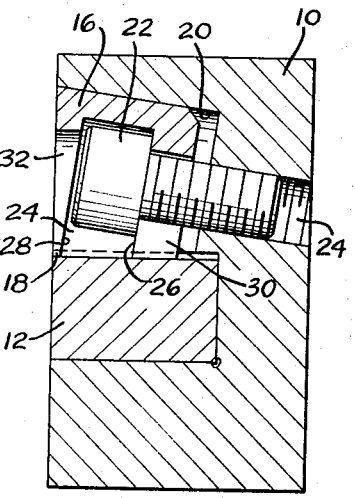
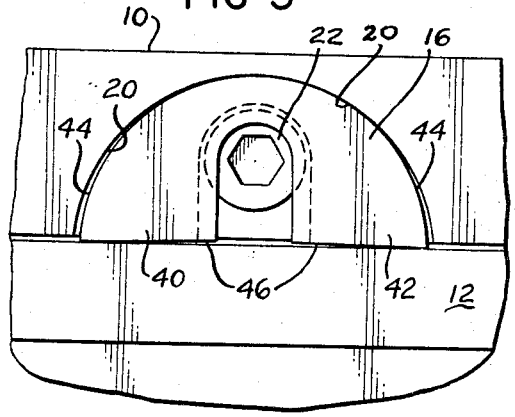
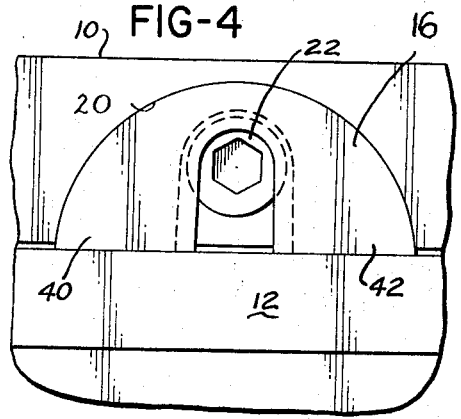
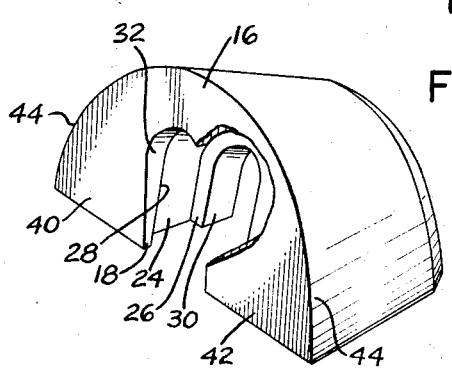
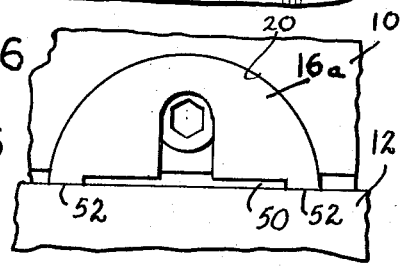
INVENTOR.
RAGNAR L. CARLSTEDT
JAMES F. McCREERY

United States Patent Office 3,354,527
Patented Nov. 28, 1967

3,354,527
CLAMP MEMBER
Ragnar L. Carlstedt, Ligonier, and James F. McCreery, Latrobe, Pa., assignors to Kennametal, Inc., Latrobe, Pa., a corporation of Pennsylvania
Filed Nov. 1, 1965, Ser. No. 505,896
10 Claims. (Cl. 29—96)

This invention relates to a machine element in the form of a novel clamp member for clamping cutter holders and the like and similar articles to be clamped in position.

The clamping such machine elements as cutter holders and the like is encountered time and again in many industrial arts and, particularly, in the machine tool art. In the machine tool art, in particular, cutters must frequently be replaced and many times the cutters take the form of a holder bar which is tipped with a hard cutting insert which may be an insert of cemented tungsten carbide. Such cutters, the term "cutter" referring to, for example, a holder or bar with an insert brazed or cemented thereon, must be accomplished relatively quickly to eliminate machine down time, and the cutter must, at the same time, be most securely held in position so it will not shift when subjected to load.

What is becoming of equal importance in precision machining is also the clamping of a cutter in a precisely located position so that the work piece turned out by the cutter will be of the proper size. Clamping arrangements heretofore for clamping cutters in position have been defective in that they provided insecure clamping, or in that they caused the cutter to shift when the clamp was tightened up, or because the clamping arrangement was complex and expensive.

A common clamping element, for example, is a plug-like member in the shape of about a half-cylinder which is disposed in an inclined half-cylindrical cut out in a support block and which, when pushed down into the cut out is wedged against the cutter or other article which is to be held in the block.

This known arrangement has two distinct disadvantages. The half-cylindrical clamp member is substantially solid and for it to be moveable in the cut out therefor, clearance must be provided between the clamp member and the cut out so that the clamp member has, in effect, line contact only with the periphery of the cut out when in clamping position. This can yield somewhat less than completely solid support for the cutter because with line contact between the clamp member and the periphery of the cut out therefor, the tool can easily become loose in use.

Another disadvantage of the known arrangement is that a double threaded screw is required with one threaded portion of the screw being threaded into the block in which the cutter is mounted and the other threaded portion of the screw, having a thread of different pitch or of the opposite band, being threaded into the clamp member. This is necessary so that the clamp member will be dislodged from clamping position when it is desired to remove or shift the cutter held thereby and the screw is loosened for this purpose. An arrangement of this nature, requiring the cutting of different threads, is, of course, expensive and required special tooling to form the threads and the screw, furthermore, must be of special purchase or special manufacture.

With the foregoing in mind, it is a primary objective of the present invention to provide an improved clamping arrangement for a cutter or a like member to be clamped in position.

Another object of this invention is the provision of a clamping arrangement for clamping a cutter or similar member in position in which the maximum possible bearing surface is obtained between the clamping member and the block in which it is mounted.

Still another object of this invention is the provision of a clamping arrangement of the nature referred to in which special clamping screws and the like are eliminated wherein, instead, a standard screw can be employed for effecting both clamping and unclamping.

Still another object of this invention is the provision of a clamp arrangement of the nature referred to in which the cutter or like member clamped in place by the clamp member is prevented from shifting longitudinally at the time of tightening up the clamp.

The foregoing objects as well as still other objects and advantages of the present invention will become more apparent upon reference to the following specification taken in connection with the accompanying drawings in which:

FIGURE 1 is a perspective view showing somewhat schmetically one arrangement wherein the clamp member according to the present invention is employed;

FIGURE 2 is a fragmentary vertical sectional view indicated by line II—II on FIGURE 1;

FIGURE 3 is a view looking in at the clamp member before tightening thereof;

FIGURE 4 is a view like FIGURE 3 but shows the appearance of the clamp member after it has been tightened up;

FIGURE 5 is a perspective view showing the clamp member; and

FIGURE 6 shows a modification.

Referring to the drawings somewhat more in detail, 10 generally indicates a support block or the like, in which a cutter or other member is to be clamped. This support may comprise any sort of supporting device, either stationary or reciprocable or rotary in which a member such as a cutter is to be clamped. In FIGURE 1, a bar 12 is shown which is in the form of a holder bar for a cutting insert 14 which may be of cemented tungsten carbide. Such holder and cutter insert combinations are well known in the machine tool art. Holder 12 is received in block 10 with clearance and is adapted for being fixedly clamped in place in the block by clamp member 16 constructed according to the present invention.

Reference to FIGURE 2, taken together with FIGURE 1, will show that clamp member 16 is a plug-like member in the form of a segment of a circle in cross section and, specifically, is substantially semi-circular when viewed from the front and is in the form of a relatively short plug with the chordal side 18 thereof inclined at an angle to the axis of the cylindrical periphery of the clamping member.

Block 10 includes a cut out or bore or recess 20 which has a cylindrical peripheral surface within which clamping member 16 is adapted to slide, and the axis of which recess 20 is also inclined.

It will be evident from FIGURE 2 that when the clamping member 16 is forced downwardly in bore or recess or cut out 20, it will wedge against holder 12 and fixedly clamp it in place in block 10.

For forcing clamping member 16 downwardly in the manner described there is a screw 22 provided which is threaded into threaded bore 24 of block 10. The screw has a head which is received in notch 25 formed inwardly from the chordal side 18 of clamp member 16. Notch 25 has an undercut region between the top and bottom faces of member 16.

It will be appreciated that the undercut in notch 25 has one side 26 engageable by the bottom of the head of screw 22 so that the clamp member 16 can be forced by the screw downwardly into cut out 20 whereas, upon rotation of the screw in the opposite direction the top of the head engages the other side 28 of the undercut of the notch and will force the clamping member out of wedging engagement with the cutter and toward unclamped position. The notch 25 in the clamping member includes portion 30 for receiving the shank portion of the screw and portion 32 for exposing the head end of the screw for receiving a wrench for rotating the screw. It will be evident at this point that the clamping member is a sort of horseshoe shaped element that has two leg portions identified at 40 and 42 in FIGURES 1, 3, 4 and 5.

The clamp member 16, in being formed in a horseshoe shape, is somewhat resilient and for this reason, the clamp member will yield somewhat when tightened up and thereby bear against substantially the complete periphery of cut out or recess 20. This promotes longer wear of the clamping member and of the surface of the cut out in which it is disposed because the clamping load is distributed over a greater area than is the case with the prior art solid clamp members previously referred to and the unit stress is thus reduced.

In FIGURE 3, where the clamping member 16 is not tightened up it will be seen that there is a slight clearance 44 about the circular periphery of the clamp member which, when the clamp is tightened up as shown in FIGURE 4 is taken up by the aforementioned yielding of the clamp member. The bearing of the legs 40 and 42 on the holder 12 can be augmented somewhat by inclining the ends of the legs as indicated at 46 in FIGURE 3. The degree of incline is so calculated that when the clamp member is tightened up, the ends of the legs, are substantially flat against holder 12 as shown in FIGURE 4. It will be understood that the clearance, shown at 44 and the angle of inclination of the legs at 46 is somewhat exaggerated in FIGURE 3 for the sake of clarity. In practice, this clearance can vary from substantially zero to a few thousandths of an inch.

In FIGURE 6, the central region of member 16a facing holder 12 is relieved by a recess 50. This results in the small legs 52 which engage holder 12 and thus produce tight gripping thereof. With the FIGURE 6 arrangement, the member 16a can fit closely in its recess 20 and does not necessarily yield any appreciable amount when tightened.

From the foregoing it will be appreciated that the arrangement of the present invention presents the first advantage of relatively low cost because standard screws can be employed and the second distinct advantage of yieldability of the clamp member, illustrated in FIGURES 3 and 4 which causes the clamp member to bear on the periphery of the cut out or notch in which it is placed thereby to reduce the stress about the periphery of both the clamp member and the cut out in which it is placed. This distribution of the stress will not only provide for longer wearing of both the clamp member and the block in which it is mounted, but will also permit much tighter clamping pressures to be employed without the difficulty of the clamping member becoming frozen in the block or of damaging the clamp member or block in any way. It will further be appreciated that holder 12 will not tend to shift in either direction when the clamp member is tightened up and that the holder 12 can be clamped in place with substantially greater force than has heretofore been possible without the danger of damaging any part of the clamping structure.

The clamp member according to the present invention, as mentioned, has wide utility and can be employed in substantially any location where an article is to be clamped fixedly in place and including, in particular, those places wherein extremely secure clamping is desired without any shifting of the clamped member when the clamping member is tightened up.

An incidental advantage that has come about on account of the flexibility of the clamp member is that the finishes of the notch or cut out in which the clamping member rests and the circular peripheral portion of the clamp member and the fit of the clamp member in the notch can be of a lower class than is necessary where the clamp member is solid. The resilience of the clamp member permits the fit of the clamping member in its recess to be such that it is extremely freely moveable therein and, at the same time, the superior results explained in detail above, will be obtained.

It will be understood that this invention is susceptible to modification in order to adapt it to different usages and conditions; and accordingly, it is desired to comprehend such modifications within this invention as may fall within the scope of the appended claims.

What is claimed is:

1. A clamping arrangement which includes a support member having a slot to receive a work member and a recess opening into the slot at one side and a clamp member comprising; a plug-like element having a peripheral portion with one side adapted for engaging a work member to be clamped by the clamp member and disposed in the slot in said support member, the remainder of the periphery of the element being adapted to be received in said recess in the support member, said remainder of said periphery comprising wall means parallel to an axis which is inclined to said one side, an axial notch extending into said clamp member from said one side about perpendicular to said one side and extending the full length of said clamp member, and an undercut in the notch between the axial ends thereof to receive the head of a clamp screw which is threaded into said support member so the screw head abuts one end wall of the undercut in either direction of movement of the screw for positive movement of the clamp member on the support member in both directions.

2. A clamping arrangement according to claim 1 in which said notch terminates at the bottom thereof in a semi-circular end region having its axis parallel to the axis of said wall means of said element.

3. A clamping arrangement according to claim 2 in which said clamp member in the region of the bottom of said notch is of such thinness that the legs of the clamp member formed by the said notch will yield relative to each other when clamping forces are exerted thereby.

4. A clamping arrangement according to claim 1 in which said element is plug-like and substantially a segment of a circle in cross section so as to have a circular peripheral portion forming said wall means while said one side is a substantially chordal peripheral portion, the plane of said chordal peripheral portion being inclined at an angle to the axis of said circular peripheral portion, said notch extending into said clamp member from about the center of said chordal peripheral portion about perpendicular to said chordal peripheral portion, said notch terminating in a semi-circular bottom region having its axis parallel to the axis of said semi-circular peripheral portion, said clamp member in the region of the bottom of said notch being of such thinness that the clamp member will yield when clamping forces are exerted thereby, said chordal peripheral portion comprising the ends of the legs of said clamp member formed by the said notch being relieved between the lateral extremities of said clamp member.

5. A clamping arrangement according to claim 1 in which said element is plug-like and substantially a segment of a circle in cross section so as to have a circular peripheral portion forming said wall means while said one side is a substantially chordal peripheral portion, the plane of said chordal peripheral portion being inclined at an angle to the axis of said circular peripheral portion, said notch extending into said clamp member from about the center of said chordal peripheral portion about perpendicular to said chordal peripheral portion, said notch terminating in a semi-circular bottom region having its axis parallel to the axis of said semi-circular peripheral portion, said clamp member in the region of the bottom of said notch being of such thinness that the clamp member will yield when clamping forces are exerted thereby, said chordal peripheral portion comprising the ends of the legs of said clamp member formed by the said notch having end surfaces which lie in respective planes that are divergent at a wide angle in a direction away from said clamp member.

6. A clamping arrangement according to claim 1 in which said support member has an outer surface and a space extending inwardly from said outer surface to form said slot to receive a member to be clamped, said support member having first and second walls extending inwardly from said surface on opposite sides of said space, said recess in the support member being formed inwardly from said surface in said first wall and having its axis inclined at an angle to said second wall so as to diverge from said second wall in a direction outwardly from said space and adapted for receiving said clamping member, said clamping member having its said wall means slidably fitting the surface of the recess and having said one side facing said second wall, said notch extending into said clamp member from about the middle of said one side and at about right angles to said one side, a screw in said undercut having a threaded shank extending out the end of said notch toward the bottom of said recess, and a threaded bore in said support member at the bottom of said recess for receiving the threaded shank of said screw and extending at an angle parallel to the axis of said recess.

7. A clamping arrangement according to claim 4 in which said support member has an outer surface and a space extending inwardly from said outer surface to form said slot to receive a member to be clamped, said support member having first and second walls extending inwardly from said surface on opposite sides of said space, said recess being in the form of a segment of a circle formed inwardly from said surface in said first wall and having its axis inclined at an angle to said second wall so as to diverge from said second wall in a direction outwardly from said space, said clamp member slidably fitting the surface of the recess and having its said chordal peripheral portion facing said second wall, a screw in said notch having a head in said undercut and a threaded shank extending out the end of said notch toward the bottom of said recess, and a threaded bore in said support member at the bottom of said recess for receiving the threaded shank of said screw and extending at an angle parallel to the axis of said recess, said chordal peripheral portion lying in a plane substantially parallel to said second wall.

8. A clamping arrangement according to claim 6 in which the said chordal peripheral portion of said clamp member comprises the ends of the legs of said clamp member formed by the said notch therein, the ends of said legs being relieved inwardly from the lateral edges of said clamp member, said clamp member being of such thinness in the region of the bottom of said notch as to be yieldable when said screw is tightened up and clamping forces are exerted by the ends of said legs.

9. A clamping arrangement according to claim 6 in which the said chordal peripheral portion of said clamp member comprises the ends of the legs of said clamp member formed by the said notch therein, said legs having their ends disposed in respective planes which diverge at a wide angle toward said second wall, said clamp member being of such thinness in the region of the bottom of said notch as to be yieldable when said screw is tightened up and clamping forces are exerted by the ends of said legs.

10. A clamping arrangement according to claim 9 in which the circular peripheral portion of said clamp member fits loosely in said recess and the angle of divergence of the planes of the ends of the legs of the clamp member is such that when the said screw is tightened up said clamp member will yield due to the clamping force exerted thereby, and the circular peripheral portion of the clamp member will engage substantially the entire periphery of said recess when the said planes of the ends of the legs substantially coincide.

References Cited
UNITED STATES PATENTS

| | | | |
|---|---|---|---|
| 2,229,112 | 1/1941 | Miller et al. | |
| 3,143,906 | 8/1964 | Smith | 82—37 |
| 3,185,004 | 5/1965 | Faust et al. | 82—37 |

WILLIAM W. DYER, Jr., *Primary Examiner.*

LEONIDAS VLACHOS, *Examiner.*